United States Patent
Moen et al.

(10) Patent No.: US 10,145,223 B2
(45) Date of Patent: Dec. 4, 2018

(54) AUTONOMOUS FLOW CONTROL SYSTEM AND METHODOLOGY

(71) Applicant: SCHLUMBERGER TECHNOLOGY CORPORATION, Sugar Land, TX (US)

(72) Inventors: Terje Moen, Sandness (NO); Andrzej T. Tunkiel, Sandnes (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 914 days.

(21) Appl. No.: 14/472,789

(22) Filed: Aug. 29, 2014

(65) Prior Publication Data

US 2015/0060084 A1 Mar. 5, 2015

Related U.S. Application Data (60) Provisional application No. 61/871,348, filed on Aug. 29, 2013.

(51) Int. Cl.
*E21B 43/12* (2006.01)
*E21B 34/08* (2006.01)
*E21B 43/08* (2006.01)

(52) U.S. Cl.
CPC .............. *E21B 43/12* (2013.01); *E21B 34/08* (2013.01); *E21B 43/08* (2013.01)

(58) Field of Classification Search
CPC .......... E21B 43/12; E21B 34/08; E21B 43/08; G05D 7/0146; G05D 7/0153; G05D 7/00; G05D 7/01; Y10T 137/2559
See application file for complete search history.

(56) References Cited

U.S. PATENT DOCUMENTS

| | | | |
|---|---|---|---|
| 6,786,285 B2 | 9/2004 | Johnson et al. | |
| 2006/0131033 A1 | 6/2006 | Bode et al. | |
| 2011/0186300 A1 | 8/2011 | Dykstra et al. | |
| 2011/0198097 A1 | 8/2011 | Moen | |
| 2012/0048563 A1 | 3/2012 | Holderman | |
| 2013/0048299 A1* | 2/2013 | Fripp | E21B 34/08 166/373 |

(Continued)

FOREIGN PATENT DOCUMENTS

| | | |
|---|---|---|
| NO | 20120872 A1 | 8/2012 |
| WO | 2010059062 A1 | 5/2010 |

OTHER PUBLICATIONS

International Search Report and Written Opinion issued in PCT/US2014/053392 dated Dec. 9, 2014, 15 pages.

(Continued)

*Primary Examiner* — Wei Wang (57) ABSTRACT

A technique facilitates regulation of flow through a flow control device to improve a well operation, such as a production operation. The technique utilizes a flow control device which has a valve positioned in a housing for movement between flow positions. The different flow positions allow different levels of flow through a primary flow port. At least one flow regulation element is used in cooperation with and in series with the valve to establish a differential pressure acting on the valve. The differential pressure is a function of fluid properties and is used to autonomously actuate the flow control device to an improved flow position.

16 Claims, 4 Drawing Sheets

(56) References Cited

U.S. PATENT DOCUMENTS

2013/0186634 A1    7/2013    Fripp et al.

OTHER PUBLICATIONS

Australian Examination Report for corresponding Australian Application No. 2014312178, dated May 3, 2017, 3 pages.
European Search Report for corresponding European Application No. 14841087.1, dated Jun. 21, 2017, 4 pages.
Article 94(3) for corresponding European Application No. 14841087.1, dated Nov. 24, 2017, 6 pages.
Eurasian Office Action for corresponding Eurasian Application Serial No. 201690489, dated Mar. 17, 2017, 4 pages.
Australian Notice of Acceptance for corresponding Australian Application No. 2014312178, dated May 1, 2018, 3 pages.
European Examination Report for corresponding European Application Serial No. 14841087.1, dated Jul. 11, 2018, 2 pages.

* cited by examiner

AUTONOMOUS FLOW CONTROL SYSTEM AND METHODOLOGY

CROSS-REFERENCE TO RELATED APPLICATIONS

The present document is based on and claims priority to U.S. Provisional Application Ser. No. 61/871,348, filed Aug. 29, 2013, which is incorporated herein by reference in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components, e.g. sand control systems, may be installed in the well. In certain applications, inflow control devices are employed to create flow restrictions through the production tubing. The fluid flow through the inflow control device moves through a port with a fixed setting which provides a controlled pressure drop. However, reservoirs may produce with an unpredictable performance associated with variations in fluid properties that result from reservoir changes and fluid changes over time.

SUMMARY

In general, a system and methodology are provided for regulating flow through flow control devices to improve a well operation, such as a production operation. The technique utilizes a flow control device, e.g. an inflow control device, which has a valve positioned in a housing for movement between flow positions. The different flow positions allow different levels of flow through a primary flow port. At least one flow regulation element is used in cooperation with the valve to establish a differential pressure acting on the valve. The differential pressure is a function of fluid properties and is used to autonomously actuate the flow control device to an improved flow position.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for facilitating a flow control operation, such as a well production operation or a well injection operation. The system and methodology enable an autonomous regulation of flow through a flow control device or flow control devices during the life of the flow control operation. In well applications, the flow control device(s) may be employed to improve the overall well operation by autonomously regulating flow over time at specific well zones as fluid properties, flow rates, and differential pressures may change with time.

The technique utilizes a flow control device, e.g. an inflow control device, which has a valve positioned in a housing for movement between flow positions. The different flow positions allow different levels of flow through a primary flow port. At least one flow regulation element is used in cooperation with the valve to establish a differential pressure acting on the valve. The differential pressure is a function of fluid properties and is used to autonomously actuate the flow control device to an improved flow position. In a well-related production operation, for example, a plurality of the flow control devices may be used as inflow control devices in cooperation with a sand control system. However, the flow control devices may be used without sand control in various types of well systems. In a sand control example, the sand control system may have a plurality of screen assemblies through which well fluid, e.g. oil, flows from a surrounding reservoir, into a wellbore, into the screen assemblies, through the flow control devices, and into a base pipe for production to a surface location or other desired location. However, the flow control devices also may be used for flow injection operations and other well related operations.

Because reservoir related flow performance can change over time or the reservoir may flow in an unexpected manner, the flow control devices described herein enable an autonomous adjustment of the flow rate at individual flow control devices to automatically improve performance of the overall system over the life of the operation. With respect to production operations, the unpredictable performance of a given reservoir often is associated with variations in fluid properties resulting from changes in the reservoir and/or changes in the fluid itself over time.

In a specific example, a well completion system comprises a flow control device for regulating fluid flow in a vertical wellbore or a deviated wellbore, e.g. a horizontal wellbore. The well completion system may be used in production operations and/or injection operations. In such applications, the flow rate tends to be higher with respect to highly permeable zones of the reservoir. The flow control device comprises at least one autonomously operated valve used in cooperation with a screen assembly of the well completion system. For example, the flow control device may be positioned beneath a filter media of the screen assembly at an end of the screen assembly. The autonomously operated valve is operable within a flow control device housing having a primary flow port coupled with a corresponding base pipe port through a base pipe of the well completion system. For example, the flow control device housing may be placed in communication with an interior of the base pipe through one or more holes, e.g. nozzles, extending through a wall of the base pipe.

The valve of the flow control device and thus the operational position of the flow control device may be regulated by a plurality of flow paths, e.g. two flow paths, which may have similar flow capacities. Based on fluid properties, a differential pressure is developed between the two flow paths even though the flow paths have similar flow capacities. The fluid flow moving along the flow paths is guided to the valve, and the valve is actuated to a desired position based on the differential pressure between the flow paths. Thus, the flow control device may be actuated autonomously to an improved position based on the fluid properties of the fluid flowing into the flow control device.

In some applications, the valve of the flow control device and thus the operational position of the flow control device also may be regulated by a single flow path. Based on fluid properties, a negative pressure may be developed at a given position in the flow path relative to both an inlet pressure and an outlet pressure. The fluid flow moving along the flow path is guided to the valve, and the valve is actuated to a desired position based on differential pressure between the given position in the flow path and either the inlet pressure or the outlet pressure. Thus, the flow control device may be actuated autonomously to an improved position based on the fluid properties of the fluid flowing into the flow control device.

Figure 1:
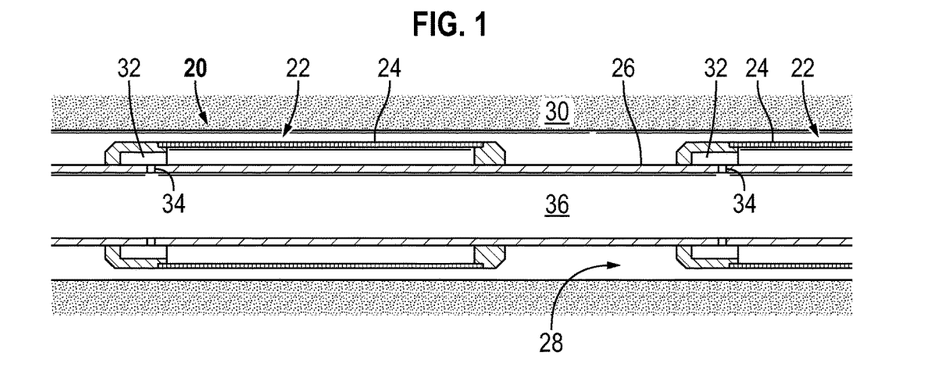
FIG. 1 is a schematic illustration of an example of a well system deployed in a wellbore and comprising at least one screen assembly in combination with a flow control device, according to an embodiment of the disclosure.

Referring generally to FIG. 1, an embodiment of a well completion system 20 is illustrated as comprising at least one and often a plurality of screen assemblies 22. The screen assemblies 22 individually comprise a filter media 24 disposed radially outward of a base pipe 26. For example, the filter media 24 may be in the form of a screen or mesh surrounding the base pipe 26. In this example, the well completion system 20 is disposed in a wellbore 28 of a well. The filter media 24 of each screen assembly 22 filters particulates from well fluid which flows into wellbore 28 from a surrounding formation and reservoir 30. In some applications, a gravel pack may be formed around the screen assemblies 22 to further filter particulates from the inflowing fluid. The well completion system 20 may be located in a deviated wellbore 28, e.g. a horizontal wellbore, located in the reservoir 30 for production of hydrocarbons fluids or other fluids.

As further illustrated in FIG. 1, a flow control device 32 is used in cooperation with the screen assembly 22. In some applications, at least one flow control device 32 may be used in cooperation with each of the screen assemblies 22 of the well completion system 20. By way of example, the flow control device 32 may be positioned radially inward of the filter media 24 of the corresponding screen assembly 22. Additionally, the flow control device 32 may be used to control flow of fluid through a base pipe port 34 (or a plurality of base pipe ports 34) extending through a wall of the base pipe 26. Depending on whether the well operation is a production operation or an injection operation, the flow control device 32 may be used to control fluid flow into an interior 36 of the base pipe 26 or fluid flow out of the base pipe 26 to the surrounding formation 30.

Figure 2:
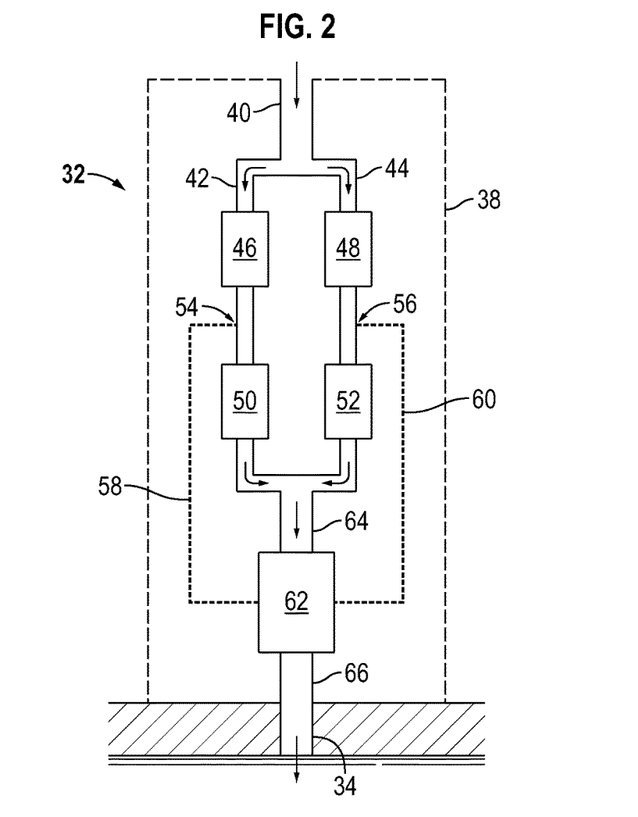
FIG. 2 is a schematic illustration of an example of a flow control device operated autonomously based on establishing differential pressures associated with changes in fluid properties, according to an embodiment of the disclosure.

Referring generally to FIG. 2, a schematic representation of an embodiment of flow control device 32 is illustrated. In this example, the flow control device 32 is an autonomous flow control device, e.g. an autonomous inflow control device, comprising at least one autonomously actuated valve. In various operations, the flow control device or devices 32 may be used in the well completion system 20 to regulate flux with respect to fluid flowing from the reservoir 30 or fluid being injected into the reservoir 30. The flow control device or devices 32 may be used to automatically change flow performance of the well completion system 20 as fluid properties change. For example, the flow control device or devices 32 may be configured to allow a higher flow rate of viscous oil versus restricting the flow rate of a less viscous fluid, such as water. In some applications, the flow control devices 32 may be configured to optimize a flow of oil versus gas and/or of gas or oil versus water.

The flow control device 32 comprises a set of flow regulation elements which automatically change the flow performance based on fluid properties, e.g. different fluid properties resulting from different fluid types. The flow regulation elements may comprise a wide variety of elements having an effect on fluid flow through the flow control device so as to create a pressure differential in the flow control device which acts autonomously to actuate a flow control device valve. For example, the flow regulation elements may be constructed to create laminar fluid flow through a thin tube if the fluid has high viscosity versus turbulent flow through a nozzle. When the fluid changes to a less viscous fluid, the flow regulation element creates a turbulent flow through the same thin tube. By combining two or more elements like this, a differential pressure is created that can be used to actuate the valve of the flow control device 32 to a desired position.

Referring again to the example illustrated in FIG. 2, the flow control device 32 may comprise a housing 38 having a flow channel 40. In production applications, fluid flowing into wellbore 28 and through filter media 24 enters the flow control device 32 through flow channel 40. The fluid, e.g. well fluid, flowing into housing 38 through flow channel 40 is split into a plurality of branches or flow paths 42 and 44 disposed in housing 38. In this example, fluid flowing along flow paths 42, 44 is directed through a plurality of flow regulation elements 46, 48, 50, 52. However, other numbers of flow regulation elements may be employed depending on the parameters of a given application. The flow regulation elements 46, 48, 50, 52 may be selected from a variety of flow restricting elements including tubes, nozzles, Venturi elements, porous material, and/or other elements which affect flow to establish the flow regulation element.

By selecting different types of flow regulation elements, a difference in pressure occurs at locations 54 and 56 along the flow paths 42 and 44, respectively. In this example, the locations 54 and 56 are positioned between the first set of flow regulation elements 46, 48 and the second set of flow regulation elements 50, 52. This differential pressure can be transferred through pressure path segments 58, 60 to a valve 62 of the flow control device 32 so as to create a pressure differential which acts on the valve 62. The differential pressure shifts the valve 62 to a corresponding position which regulates a total flow of fluid passing along the flow paths 42, 44 to valve 62, through a valve port 64, and then exiting valve 62 through a primary flow port 66 positioned in housing 38. The valve 62 is connected in series with the flow paths 42 and 44. In this example, the flow control device 32 may be mounted on base pipe 26 at base pipe port 34 such that primary flow port 66 in housing 38 discharges fluid into and through base pipe port 34.

It should be noted the configuration and layout of the autonomous flow control device 32 illustrated in FIG. 2 is provided as an example and other configurations and layouts may be used in various applications. For example, the valve 62 may be positioned at the entry to housing 38 or at a different locations along the flow paths 42, 44 through the flow control device 32. Additionally, some of the flow regulation elements 46, 48, 50, 52 may be located at other positions and/or integrated into the flow regulating valve 62. Additionally, the flow control device 32 may be used in applications in which the fluid flow is reversed to enable injection operations or other well treatment operations.

The flow regulation elements, e.g. flow regulation elements 46, 48, 50, 52, may comprise a variety of features including tubes, nozzles, Venturi elements, porous materials, and/or other features having different flow characteristics for different fluids. For example, the different flow regulation elements may each have a different Reynolds number. With respect to high Reynolds numbers, the flow tends to be more turbulent and the pressure drop depends largely on fluid density and is proportional to velocity squared. For laminar fluid flow, the pressure drop is more dependent on viscosity and is proportional to velocity. For the various flow regulation elements 46, 48, 50, 52, the transition between turbulent and laminar flow behaves differently. Thus, the flow regulation elements can be constructed to have a different Reynolds number for a given flow rate by adjusting flow regulation element related properties such as velocity and diameter. By way of example, the Reynolds number for a nozzle type flow regulation element can be modified by using several smaller nozzles in parallel or several larger nozzles in series instead of a single physical nozzle, thus providing different flow regulation elements for a given, similar flow area along flow paths 42, 44. In another example, the flow regulation element 48 may comprise a long thin tube or a porous material and flow regulation element 52 may comprise a diffuser or Venturi type element. Various other types and arrangements of flow regulation elements may be employed to create the desired pressure differential based on the different flow characteristics of a given fluid passing through the flow regulation elements. The different types of flow regulation elements disposed in flow control device 32 enable pressure differentials to be established so as to automatically actuate the valve 62 to a desired flow position.

Figure 3:
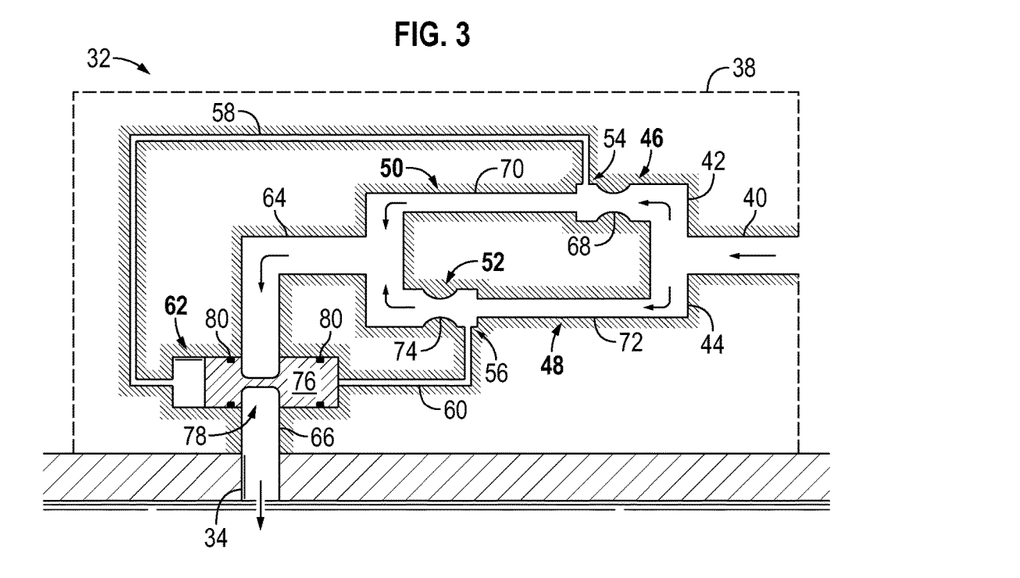
FIG. 3 is a schematic illustration of another example of a flow control device, according to an embodiment of the disclosure.
Figure 4:
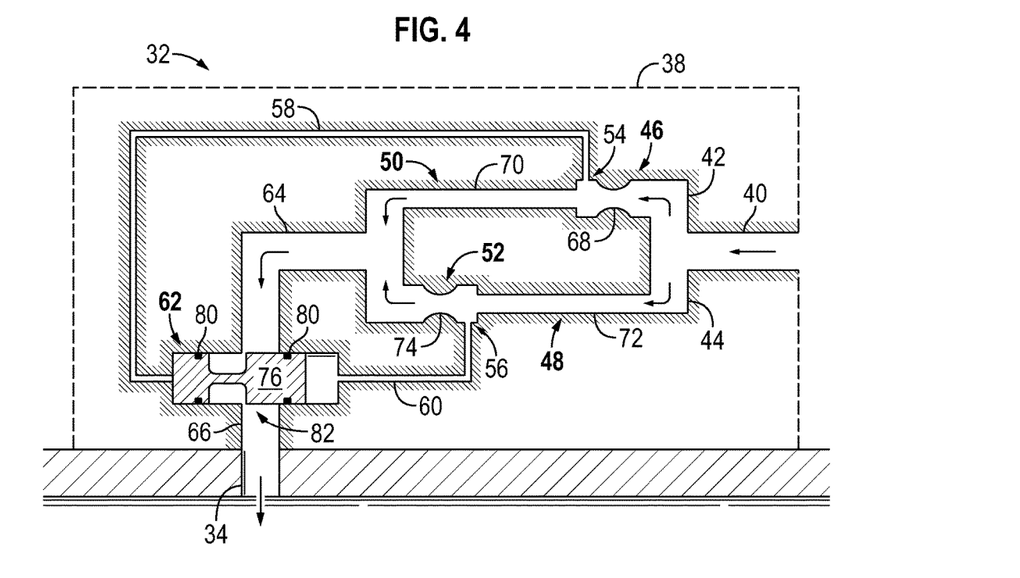
FIG. 4 is a schematic illustration similar to that of FIG. 3 but showing the flow control device in a different operational position, according to an embodiment of the disclosure.

Referring generally to FIGS. 3 and 4, another embodiment of flow control device 32 is illustrated. In this example, fluid flow, e.g. production fluid flow, again enters flow control device housing 38 via flow channel 40 and exits at primary flow port 66. However, the flow direction may be reversed for some applications such that fluid enters at port 66 and exits through flow channel 40. After entering the flow control device 32 through flow channel 40, the fluid is diverted into flow paths 42 and 44. In this example, fluid moving along flow path 42 is subjected to flow regulation element 46, which is in the form of a nozzle 68, and also to flow regulation element 50, which is in the form of a thin tube 70. The pressure path segment 58 extends from a location between the flow regulation elements 46, 50 to one side of valve 62. The fluid moving along flow path 44 is subjected to flow regulation element 48, which is in the form of a thin tube 72, and also to flow regulation element 52, which is in the form of a nozzle 74. The pressure path segment 60 extends from a location between the flow regulation elements 48, 52 to an opposite side of valve 62, as illustrated. In this example, the same types of flow regulation elements are used along each flow path 42 and 44 but the types are positioned in an opposite order.

In the embodiment illustrated, the thin tubes 70, 72 and the nozzles 68, 74 are sized such that for viscous oil the tube 70 or 72 provides a higher pressure than the corresponding nozzle 68 or 74. This characteristic results because the flow in the thin tubes 70, 72 is mainly affected by fluid viscosity. As a result, a flow of viscous oil creates a higher pressure along segment 58 than along segment 60 and this differential pressure is transferred to the flow regulating valve 62. The differential pressure causes the valve 62 to be actuated to an appropriate valve position by moving a valve piston 76 toward, for example, a fully open position 78, as illustrated in FIG. 3. The fully open position 78 allows maximum fluid flow through the valve 62 from valve port 64 and out through primary flow port 66 into base pipe 26 via base pipe port 34. In this example, the valve piston 76 may be equipped with seals 80 or with a gap having sufficiently narrow tolerances which ensure minimal leakage flow past piston 76.

Referring again to FIG. 4, in the case of a low viscosity fluid entering the flow control device 32 via flow channel 40, the tube pressure drop along thin tubes 70, 72 is less. As a result, a different pressure balance in the control segments 58, 60 occurs. In fact, the flow of low viscosity fluid, e.g. water, through flow control device 32 creates a higher pressure along control segment 60 than along control segment 58 and this differential pressure is transferred to the flow regulating valve 62. This differential pressure causes the valve 62 to be actuated to an appropriate valve position by moving the valve piston 76 toward a choked position 82, e.g. a restricted flow or no flow position, as illustrated in FIG. 4. The choked position 82 blocks or reduces fluid flow through the valve 62 from valve port 64 and out through primary flow port 66.

Figure 5:
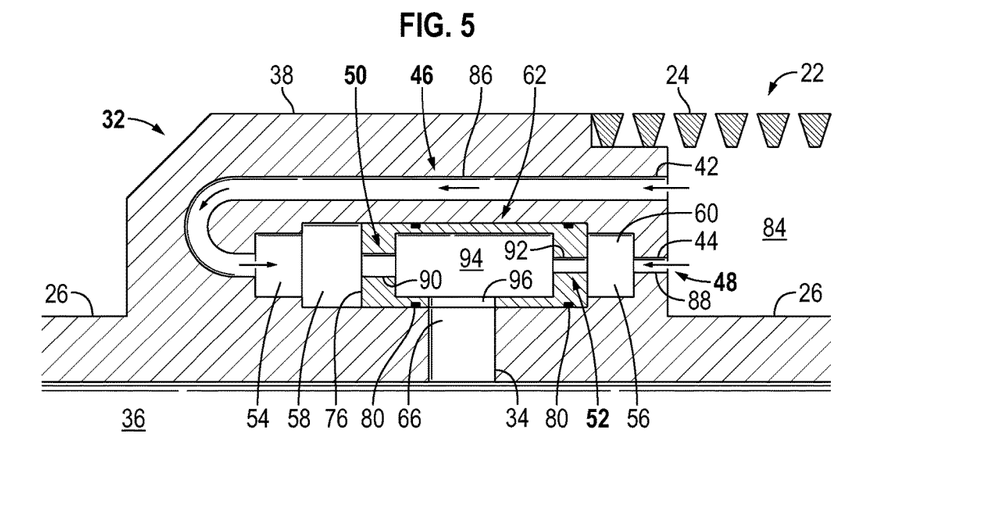
FIG. 5 is a schematic illustration of another example of a flow control device, according to an embodiment of the disclosure.
Figure 6:
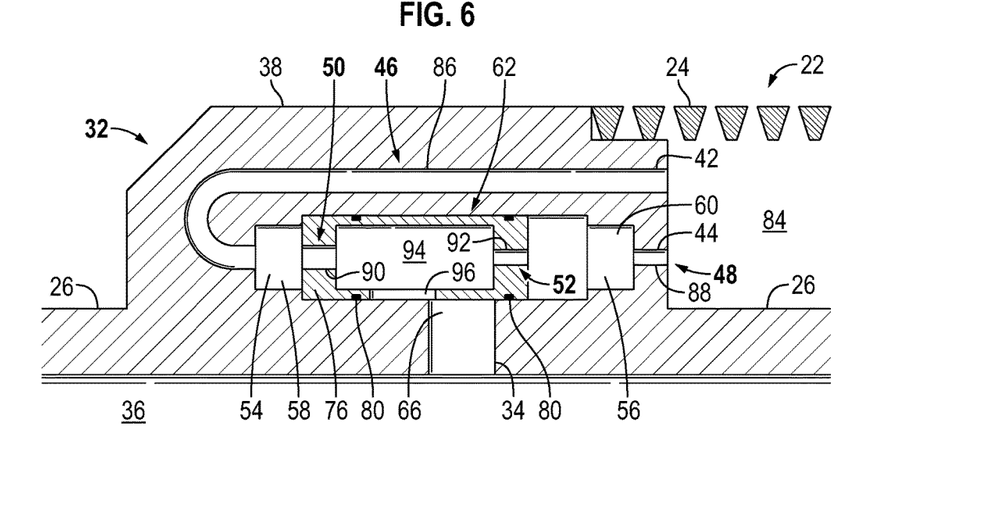
FIG. 6 is a schematic illustration similar to that of FIG. 5 but showing the flow control device in a different operational position, according to an embodiment of the disclosure.

Referring generally to FIGS. 5 and 6, another embodiment of flow control device 32 is illustrated. In this example, fluid flow, e.g. production fluid flow, enters flow control device housing 38 from a region 84. By way of example, region 84 may be a region adjacent the flow control device 32 and between the base pipe 26 and the filter media 24 of a given screen assembly 22. In this embodiment, the fluid flows from region 84 and moves through flow control device 32 before exiting at primary flow port 66. However, the flow direction may be reversed for some applications, e.g. injection applications, such that fluid enters at port 66 and exits into region 84.

Fluid flowing from reservoir 30 moves through filter media 24 and into region 84. The flow is then diverted into the two flow paths 42 and 44. In this embodiment, flow regulation element 46 is in the form of a tube element 86 and flow regulation element 48 is in the form of a nozzle 88. The tube element 86 tends to be more dominated by a pressure drop than nozzle 88 when a viscous fluid is flowing along flow paths 42, 44.

In this embodiment, the flow paths 42, 44 continue to valve 62 to deliver fluid to the valve 62 and the actuation position of valve 62 is regulated by a difference in pressure at pressure path segments 58 and 60 as a result of the fluid flow through the first set of flow regulation elements 46 and 48. In this example, the flow regulating valve 62 has the second set of flow regulating elements 50, 52 formed into valve piston 76 in the form of flow ports 90, 92, respectively. The flow ports 90, 92 extend to an interior 94 of the piston 76. The fluid flow along the two flow paths 42, 44 meets at piston interior 94 before exiting through a piston port 96 and flowing out through primary flow port 66 of housing 38 before entering interior 36 of base pipe 26 via base pipe port 34.

If a fluid with different properties, e.g. less viscous water as compared to viscous oil, flows to region 84 and into flow paths 42, 44, the flow regulation elements 46, 48, 50, 52 establish a different pressure differential acting on piston 76 of valve 62. In this example, the piston 76 is shifted to a choked flow position, as illustrated in FIG. 6. The movement of piston 76 restricts or blocks the flow of fluid exiting piston interior 94 through piston port 96 and thus chokes off the flow of fluid to base pipe interior 36 via base pipe port 34.

Figure 7:
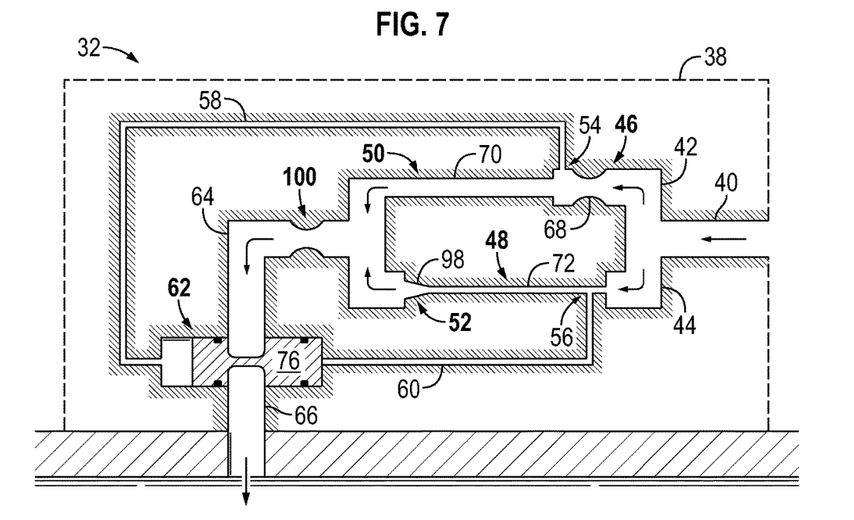
FIG. 7 is a schematic illustration of another example of a flow control device, according to an embodiment of the disclosure.

Referring generally to FIG. 7, another embodiment of flow control device 32 is illustrated. In this example, fluid flow, e.g. production fluid flow, again enters flow control device housing 38 via flow channel 40 and exits at primary flow port 66. As discussed above, the flow direction may be reversed for some applications such that fluid enters at port 66 and exits through flow channel 40. After entering the flow control device 32 through flow channel 40, the fluid is diverted into flow paths 42 and 44. In this example, fluid moving along flow path 42 is subjected to flow regulation element 46, which is in the form of nozzle 68, and also to flow regulation element 50, which is in the form of thin tube 70. The pressure path segment 58 extends from a location between the flow regulation elements 46, 50 to one side of valve 62. The fluid moving along flow path 44 is subjected to flow regulation element 48, which is in the form of thin tube 72, and also to flow regulation element 52, which is in the form of a diffuser 98. The pressure path segment 60 extends from a location joining thin tube 72 and is routed to an opposite side of valve 62, as illustrated. In this example, the flow regulation elements 48 and 52 could be considered cooperating features of a single flow regulation element. In some applications, an additional flow regulation element 100, e.g. a nozzle or other suitable flow regulation element, may be placed in the flow path directing fluid through valve port 64.

Similar to the embodiments discussed above, the flow regulation elements 46, 48, 50, 52 establish a differential pressure at locations 54, 56 as a function of fluid properties. This differential pressure acts on valve 62 to autonomously actuate the valve 62 and thus the flow control device 32 to an improved flow position based on the fluid properties of fluid flowing through the flow control device 32.

Figure 8:
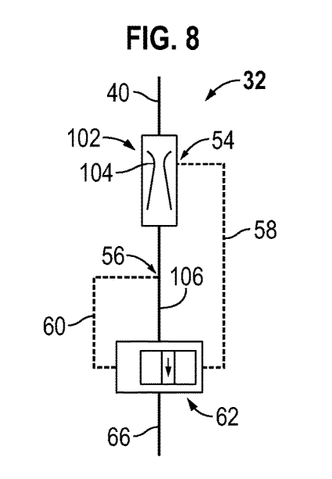
FIG. 8 is a schematic illustration of another example of a flow control device operated autonomously based on establishing differential pressures associated with changes in fluid properties, according to an embodiment of the disclosure.

Referring generally to FIG. 8, a schematic representation of another embodiment of flow control device 32 is illustrated. In this embodiment, fluid enters flow control device 32 via flow channel 40 and flows through a flow regulation element 102, which may be in the form of a Venturi element 104, connected in series with valve 62. Pressure path segment 58 may be connected between valve 62 and the Venturi element 104 at, for example, the point of its smallest cross-sectional area or relatively close to this point of smallest cross-sectional area. The pressure path segment 60 may be connected between an opposite side of valve 62 and a region along a flow path 106 between Venturi element 104 and valve 62. In another layout, the pressure path segment, e.g. pressure path segment 60, may be connected to the primary flow port 66.

When fluid of relatively low viscosity or relatively high Reynolds number flows into flow channel 40 and through Venturi element 104, the pressure along pressure path segment 58 tends to be less than both the inlet and exit pressures of the Venturi element 104. However, when fluid of relatively high viscosity or lower Reynolds number flows into channel 40 and through Venturi element 104, the pressure along pressure path segment 58 will not be less than at least the exit pressure of the Venturi element 104. The exit pressure (or in some cases the inlet pressure) is applied to the opposite side of valve 62 via pressure path segment 60. Thus, the variation or difference in pressure in pressure path segment 58 versus the outlet pressure in pressure path segment 60 can be used to autonomously regulate the valve position of valve 62 based on changes in the viscosity (or other characteristic) of fluid flowing through the flow control device 32.

Figure 9:
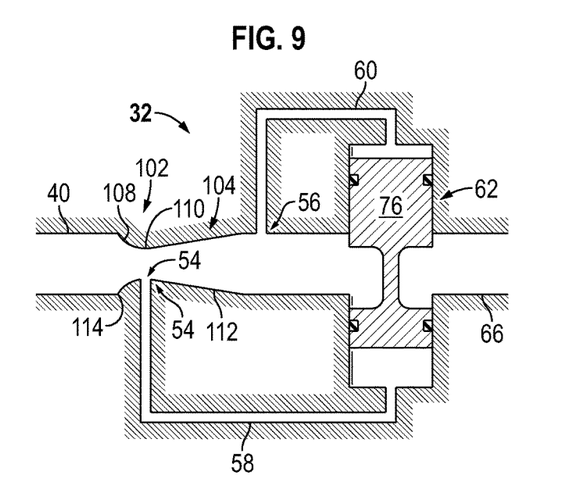
FIG. 9 is a schematic illustration of another example of a flow control device, according to an embodiment of the disclosure.

Referring generally to FIG. 9, an embodiment of flow control device 32 is illustrated in which the flow regulation element 102 comprises Venturi element 104 and valve 62 utilizes valve piston 76. In this example, the fluid entering into flow channel 40 flows into a smooth entry region 108 of Venturi element 104 which increases the velocity of the fluid. As a result of the Bernoulli effect, a reduction in pressure is achieved in a reduced cross-sectional area region 110, e.g. the region of smallest cross-sectional area, of the Venturi element 104. A diffuser region 112 of Venturi element 104 helps regain kinetic energy of the flowing fluid and, as a result, the pressure increases in this region. In this example, pressure path segment 58 is connected between reduced cross-sectional area region 110 and one side of piston 76 of valve 62. The other pressure path segment 60 is connected between diffuser region 112 and the other side of piston 76 of valve 62.

In the case of a more viscous fluid flowing through flow control device 32, the viscous frictional pressure loss tends to dominate over the Bernoulli effect, thus resulting in a shift in differential pressure acting on piston 76 across valve 62. The Venturi element 104 is constructed to create a desired shift in differential pressure as the type of fluid flowing through flow control device 32 changes, e.g. as fluid flow changes from desired to undesired fluids or vice versa. In some applications, the Venturi element 104 may be constructed in a manner which deviates from conventional design rules which tend to optimize certain functions of the Venturi for conventional applications. In some applications, for example, the Venturi element 104 may be constructed with a sharper corner or corners 114 at the Venturi entrance. In some applications, the inlet tube section leading into the Venturi may be longer and the diffuser region 112 may have various features, e.g. sudden diameter changes in outlet diameter to create a rapid expansion of the fluid flow area. These features may be selected to enable creation of desired differential pressures based on the different fluid types flowing through the flow control device 32.

The well completion system 20 may be used in a variety of applications, including numerous types of well production applications and injection applications. Depending on the specifics of a given well application and environment, the construction of the overall completion system 20, and the construction, number, and configuration of screen assemblies 22 and flow control devices 32 may vary. For example, various numbers of screen assemblies 22 may be employed and one or more flow control devices 32 may be used with the individual screen assemblies. Additionally, the system 20 may be designed for use in many types of wells, e.g. horizontal wells and other types of deviated wells. The wells may be drilled in a variety of formations with single or multiple production zones and with many types of gravel packs. The wells also may be drilled as open hole wellbores used in combination with annular packers.

Depending on the application, many types of flow control devices 32 may be employed in the overall system 20. For example, the flow control devices 32 may be constructed as inflow control devices for controlling the inflow of production fluid and/or other well fluid. However, the flow control devices 32 also may be constructed to accommodate outflow of fluid during, for example, fluid injection operations. Additionally, the individual flow control devices 32 may have various types of housings, passages, pistons, and flow regulation elements arranged to regulate flow based on differential pressures established as a result of the different fluid properties of fluid flowing through the individual flow control devices 32. Additionally, many types and arrangements of flow regulation elements may be employed to establish the changing pressure differential according to the changing properties of fluids flowing through the flow control device 32. Similarly, various materials may be used in constructing the flow control device housing, piston, and/or other features and elements of the flow control devices.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for controlling flow, comprising:
a completion system deployed in a wellbore, the completion system comprising an autonomous flow control device to regulate fluid flow through a port, the autonomous flow control device comprising:
a housing having a plurality of flow paths connected in parallel with each other;
a valve disposed in the housing and exposed to the plurality of flow paths such that the valve is connected in series with the plurality of flow paths; and
a plurality of flow regulation elements, each flow regulation element disposed along a respective flow path of the plurality of flow paths, each flow regulation element establishing a differential pressure as a function of fluid properties of a fluid flowing along the respective flow path, the differential pressure established by the flow regulation elements being used to actuate the valve to regulate the fluid flow through the port.

2. The system as recited in claim 1, wherein at least one of the flow regulation elements comprises a thin tube or a porous element.

3. The system as recited in claim 1, wherein at least one of the flow regulation elements comprises a nozzle or an orifice.

4. The system as recited in claim 1, wherein at least one of the flow regulation elements comprises a Venturi element.

5. The system as recited in claim 1, wherein the plurality of flow regulation elements includes a combination of thin tubes and nozzles.

6. The system as recited in claim 1, wherein the completion system comprises at least one screen assembly having a base pipe and a filter media positioned radially outward of the base pipe, the port being disposed through a wall of the base pipe.

7. The system as recited in claim 6, wherein the autonomous flow control device is positioned between the filter and the base pipe.

8. A device for controlling flow, comprising:
a housing having a primary flow port;
a valve positioned in the housing to control a fluid flow through the primary flow port;
a plurality of flow paths connected in parallel with each other, each of the flow paths in communication with the valve such that the valve is connected in series with the plurality of flow paths; and
a plurality of flow regulation elements, each flow regulation element positioned along a respective flow path, each flow regulation element establishing a differential pressure acting on the valve, the differential pressure being a function of fluid properties of a fluid flowing along the respective flow path, the differential pressure established by the flow regulation elements being used to autonomously actuate the valve to regulate fluid flow through the primary flow port.

9. The device as recited in claim 8, wherein the plurality of flow regulation elements include a combination of different types of flow regulation elements.

10. The device as recited in claim 9, wherein the valve comprises a valve piston which is shifted by the differential pressure established by each of the flow regulation elements to control fluid flow through the primary flow port.

11. The device as recited in claim 9, wherein the plurality of flow regulation elements comprises a tube element, a nozzle, and a pair of flow ports.

12. The device as recited in claim 8, wherein at least one of the flow regulation elements comprises a Venturi element.

13. A method for controlling flow, comprising:
positioning a valve in a housing such that the valve is shiftable between flow positions which allow different levels of flow through a primary flow port, wherein the valve is in series with a plurality of flow paths that are connected in parallel with each other; and
using a plurality of flow regulation elements, each flow regulation element positioned along a respective flow path of the plurality of flow paths, to establish a differential pressure acting on the valve as a function of fluid properties of a fluid flowing into the housing, the valve being actuated to a flow position based on the differential pressure.

14. The method as recited in claim 13, wherein the plurality of flow regulation elements comprises four flow regulation elements.

15. The method as recited in claim 13, wherein using the plurality of flow regulation elements comprises using different types of flow regulation elements which restrict flow differently depending on a viscosity of the fluid flowing through the flow regulation elements.

16. The method as recited in claim 13, further comprising mounting the housing in a screen assembly of a sand control completion to regulate flow of fluids to an interior of a base pipe of the sand control completion.

* * * * *